United States Patent [19]

Williams

[11] Patent Number: 5,063,702
[45] Date of Patent: Nov. 12, 1991

[54] DEVICE FOR STORING AND DISPENSING A TROTLINE

[76] Inventor: Larry Williams, 1309 Alice, Longview, Tex. 75604

[21] Appl. No.: 633,802

[22] Filed: Dec. 26, 1990

[51] Int. Cl.⁵ ............................................. A01K 97/06
[52] U.S. Cl. ........................................ 43/27.4; 43/21.2
[58] Field of Search ..................... 43/27.4, 21.2, 6.5, 43/4

[56] References Cited

U.S. PATENT DOCUMENTS

| | | | |
|---|---|---|---|
| 2,531,816 | 11/1950 | Homoky | 43/27.4 |
| 2,629,197 | 2/1953 | Duvall | 43/27.4 |
| 3,085,767 | 4/1963 | Zerbest | 43/27.4 |
| 3,201,890 | 8/1965 | Griggs | 43/27.4 |
| 3,626,630 | 12/1971 | Tison | 43/27.4 |
| 3,775,893 | 12/1973 | McGee | 43/27.4 |
| 3,818,625 | 6/1974 | Shults | 43/27.4 |
| 3,870,259 | 3/1975 | Reynolds | 43/21.2 |
| 4,064,811 | 12/1977 | Copeland | 43/21.2 |

Primary Examiner—Kurt Rowan
Attorney, Agent, or Firm—Michael I. Kroll

[57] ABSTRACT

A device is provided for storing and dispensing a trotline having hooks and consists of a reel rotatably mounted on a U-shaped frame which is mounted transversely to a base that is mounted onto a transom or bow of a boat. A crank handle assembly is rotatably mounted on the U-shaped frame for turning the reel counterclockwise to store the trotline and clockwise to dispense the trotline. A structure is provided on the reel for retaining the hooks of the trotline when it is stored on the reel.

6 Claims, 2 Drawing Sheets

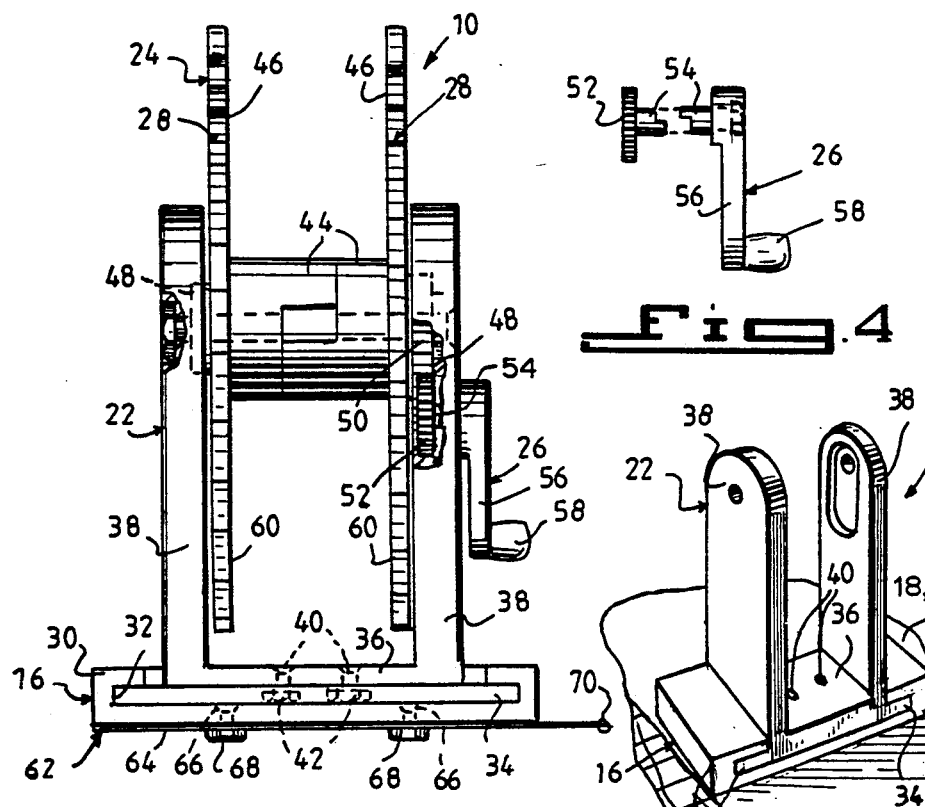
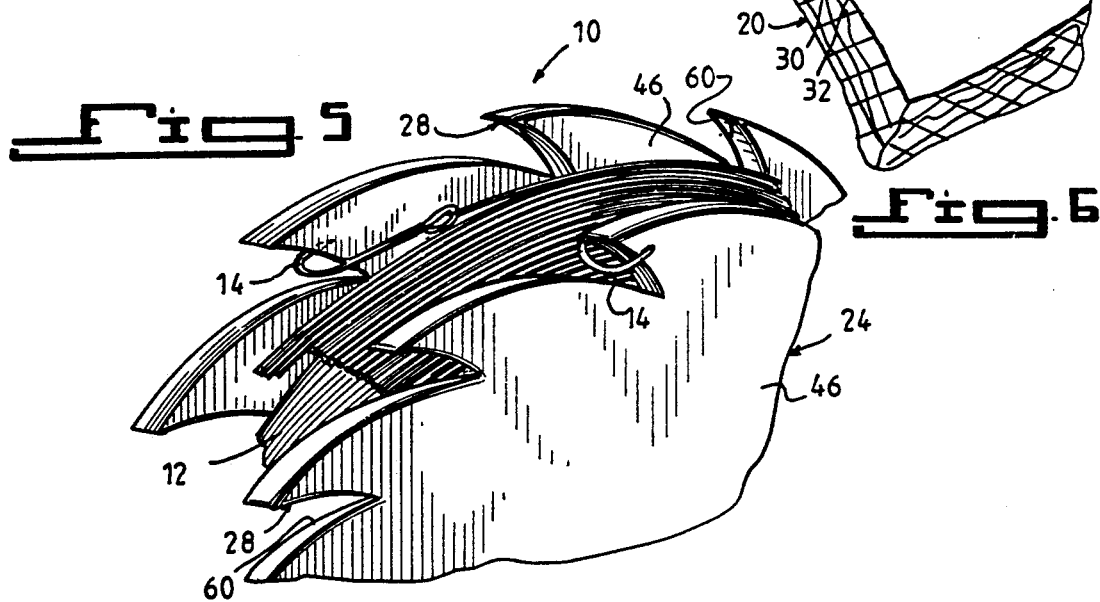

DEVICE FOR STORING AND DISPENSING A TROTLINE

BACKGROUND OF THE INVENTION

1. Field of the Invention

The instant invention relates generally to trotlines and more specifically it relates to a device for storing and dispensing a trotline.

SUMMARY OF THE INVENTION

A primary object of the present invention is to provide a device for storing and dispensing a trotline that will overcome the shortcomings of the prior art devices.

Another object is to provide a device for storing and dispensing a trotline that is mounted to a transom or bow of a boat which can handle two trotlines with up to fifty hooks without removal of the hooks and staging.

An additional object is to provide a device for storing and dispensing a trotline that is much faster than other ways of winding up trotline by hand.

2. Description of the Prior Art

Numerous trotlines have been provided in prior art that are adapted to each include a stout line reaching across a stream or for some distance from one bank, bearing at frequent intervals, single hooks hung by short lines. While these units may be suitable for the particular purpose to which they address, they would not be as suitable for the purposes of the present invention as heretofore described.

A further object is to provide a device for storing and dispensing a trotline that is simple and easy to use.

A still further object is to provide a device for storing and dispensing a trotline that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is an elevational view taken in direction of arrow 3 in FIG. 2 with parts broken away.

FIG. 4 is a side view of the crank handle assembly which rotates the reel.

FIG. 5 is an enlarged perspective view of a portion of the reel showing the trotline thereon with the hooks in engagement within the saw-toothed slots.

FIG. 6 is a perspective view of the invention mounted directly onto the transom or bow with the reel and crank handle assembly removed therefrom.

DETAILED DESCRIPTION OF THE PREFERRED EMBODIMENTS

Figure 1:
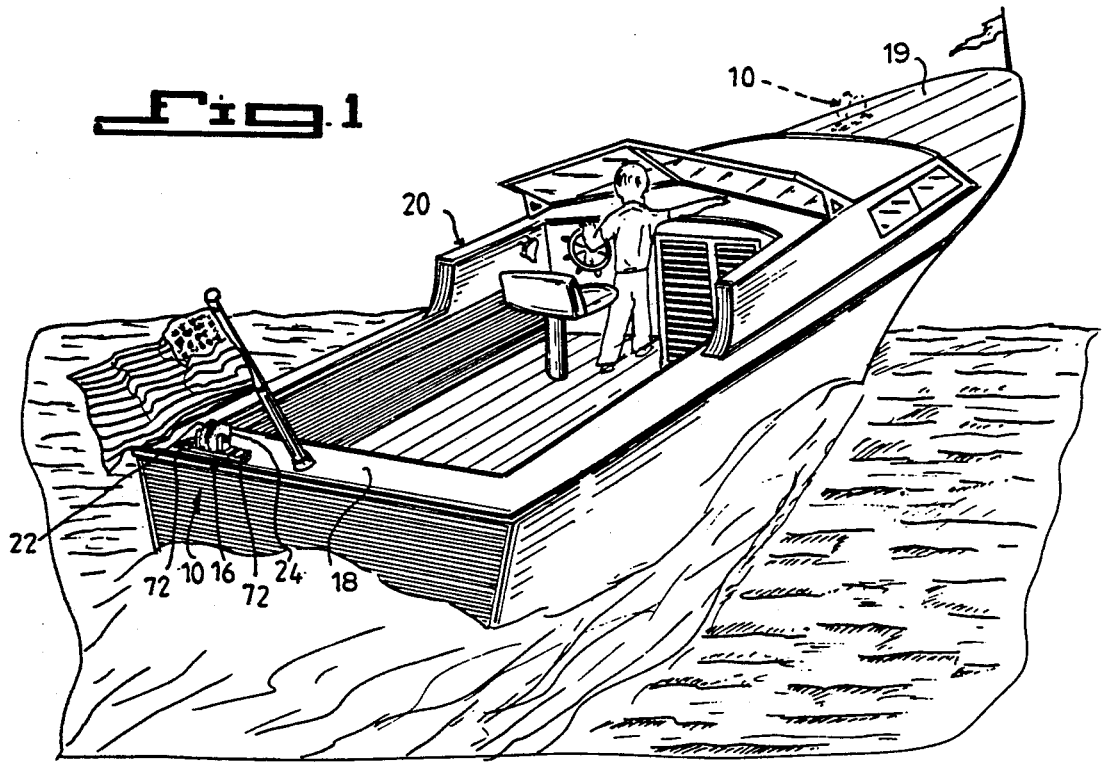
FIG. 1 is a perspective view of a boat with the instant invention installed on the transom or bow.
Figure 2:
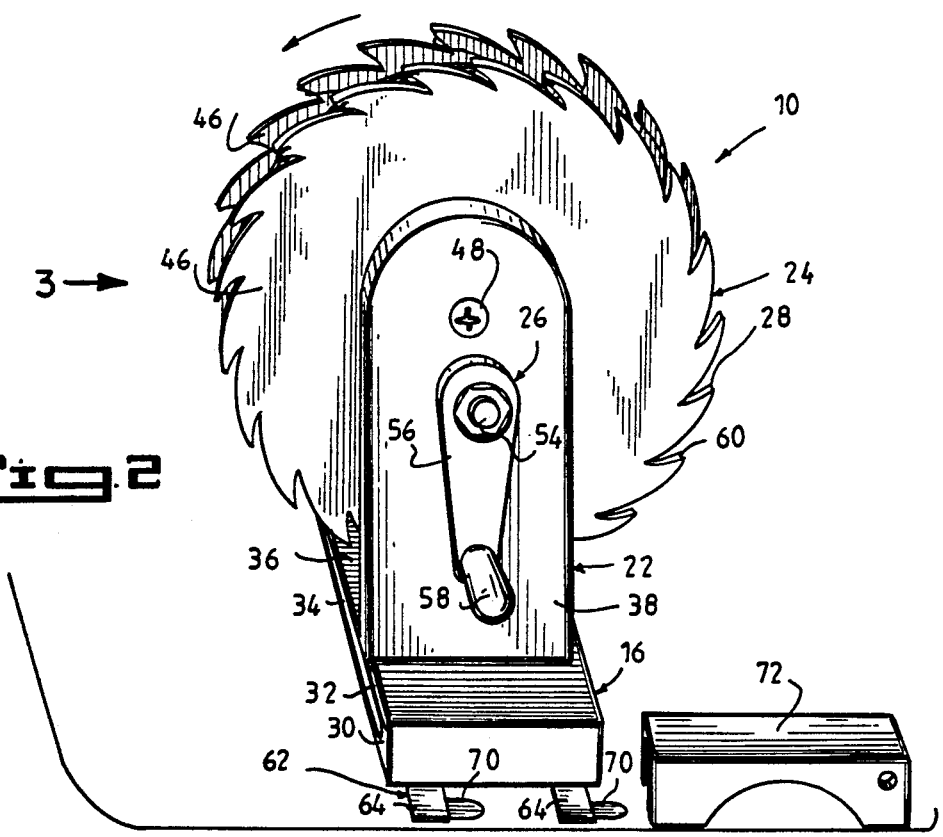
FIG. 2 is a perspective view of the invention.

Turning now descriptively to the drawings, in which similar reference characters denote similar elements throughout the several views, the figures illustrate a device 10 for storing and dispensing a trotline 12 with hooks 14 consisting of a base 16 mounted onto a transom 18 or bow 19 of a boat 20. A U-shaped frame 22 is mounted to the base 16, while a reel 24 is rotatably mounted on the U-shaped frame 22. A crank handle assembly 26 is rotatably mounted on the U-shaped frame 22 for turning the reel 24 counterclockwise to store the trotline 12 and clockwise to dispense the trotline 12. A structure 28 is on the reel 24 for retaining the hooks 14 of the trotline 12 when the trotline is stored onto the reel 24.

The base 16 includes a stationary member 30 having a track 32 thereon. The stationary member 30 is mounted onto the transom 18 or bow 19 of the boat 20 by any known types of fasteners, such as bolts, screws, etc. An extension member 34 is engagable within the track 30 on the stationary member 30.

The U-shaped frame 22 includes a bottom portion 36 and two upwardly extending side portions 38. A bottom portion 36 is mounted onto the extension member 34 of the base 16 by a pair of screws 40 and nuts 42.

The reel 24 includes a hub 44 to receive the wrap around trotline 12. A pair of circular skirts 46 are carried on each side of the hub 44. A pair of bearings 48 are also provided. Each extend outwardly from one skirt 46 to rotatably engage with one side portion 38 of the frame 22. A gear ring 50 is formed between one skirt 46 and one bearing 48.

The crank handle assembly 26 includes a gear member 52 rotatably carried in one side portion 38 of the frame 22 to engage with the gear ring 50. A shaft 54 is connected at one end to the gear member 52 and extends through the side portion 38 of the frame 22. A crank handle 56 is connected to the other end of the shaft 54, while a knob 58 is connected to the distal end of the crank handle 56.

The retaining structure 28 includes a plurality of saw-toothed slots 60 carried on the circumference of each circular skirt 46 of the reel 24.

The device 10 can further contain a bracket 62 that includes a pair of flat adjustment bars 64 mounted to the underside of the base 16 by four mounting screws 66 and nuts 68. Each bar 64 has a round pin 70 extending at a right angle from one exposed end thereof. A pair of U-shaped housings 72 are provided. Each housing 72 is mounted (not shown) spaced apart onto the transom 18 or bow 19 of the boat 12 so that the base 16 can fit therebetween with the round pins 70 extending into one of the U-shaped housings 72 to retain the device 10 thereto.

LIST OF REFERENCE NUMBERS 10 device
12 trotline
14 hook on 12
16 base
18 transom
19 bow
20 boat
22 U-shaped frame
24 reel
26 crank handle assembly
28 retaining structure
30 stationary member of 16
32 track on 30
34 extension member of 16
36 bottom portion of 22
38 upwardly extending side portion of 22

40 screw
42 nut
44 hub of 24
46 circular skirt of 24
48 bearing of 24
50 gear ring of 24
52 gear member of 26
54 shaft of 26
56 crank handle of 26
58 knob of 26
60 saw-toothed slot of 28
62 bracket
64 flat adjustment bar of 62
66 mounting screw
68 mounting nut
70 round pin on 64
72 U-shaped housing of 62

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for storing and dispensing a trotline having hooks comprising:
   a) a base mounted onto a transom/bow of a boat;
   b) a U-shaped frame mounted to said base
   c) a reel rotatably mounted on said U-shaped frame;
   d) a crank handle assembly rotatably mounted on said U-shaped frame for turning said reel counterclockwise to store the trotline and clockwise to dispense the trotline; and
   e) means on said reel for retaining the hooks of the trotline when the trotline is stored onto said reel, further comprising a bracket that includes:
   a pair of flat adjustment bars mounted to the underside of said base, each said bar having a round pin extending at a right angle from one exposed end thereof; and
   a pair of U-shaped housings, each mounted spaced apart onto the transom/bow of the boat so that said base can fit therebetween with the round pins extending into one of said U-shaped housings to retain said device thereto.

2. A device as recited in claim 1, wherein said base includes:
   a) a stationary member having a track thereon, said stationary member mounted onto the transom/bow of the boat; and
   b) an extension member engagable within the track on said stationary member.

3. A device as recited in claim 2, wherein said U-shaped frame includes a bottom portion and two upwardly extending side portions wherein said bottom portion is mounted onto said extension member of said base.

4. A device as recited in claim 3, wherein said reel includes:
   a) a hub to receive the wrap around trotline;
   b) a pair of circular skirts carried on each side of said hub;
   c) a pair of bearings each extending outwardly from one said skirt to rotatably engage with one said side portion of said frame; and
   d) a gear ring formed between one said skirt and one said bearing.

5. A device as recited in claim 4, wherein said crank handle assembly includes:
   a) a gear member rotatably carried in one said side portion of said frame to engage with said gear ring;
   b) a shaft connected at one end to said gear member and extending through said side portion of said frame;
   c) a crank handle connected to other end of said shaft; and
   d) a knob connected to the distal end of said crank handle.

6. A device as recited in claim 5, wherein said hook retaining means includes a plurality of saw-toothed slots carried on the circumference of each said circular skirt of said reel.

* * * * *